(12) United States Patent
Okumoto et al.

(10) Patent No.: US 9,019,459 B2
(45) Date of Patent: Apr. 28, 2015

(54) LIQUID CRYSTAL DISPLAY PANEL

(75) Inventors: Yoshitaka Okumoto, Osaka (JP);
Toshinori Sugihara, Osaka (JP);
Toshihide Tsubata, Osaka (JP); Keiichi Tanaka, Osaka (JE)

(73) Assignee: Sharp Kabushiki Kaisha, Osaka (JP)

( * ) Notice: Subject to any disclaimer, the term of this patent is extended or adjusted under 35 U.S.C. 154(b) by 320 days.

(21) Appl. No.: 13/581,089

(22) PCT Filed: Nov. 29, 2010

(86) PCT No.: PCT/JP2010/071278
§ 371 (c)(1),
(2), (4) Date: Sep. 12, 2012

(87) PCT Pub. No.: WO2011/104962
PCT Pub. Date: Sep. 1, 2011

(65) Prior Publication Data
US 2013/0003008 A1    Jan. 3, 2013

(30) Foreign Application Priority Data

Feb. 26, 2010  (JP) ................................. 2010-043160

(51) Int. Cl.
G02F 1/1339   (2006.01)
G02F 1/1335   (2006.01)
G02F 1/1362   (2006.01)

(52) U.S. Cl.
CPC ...... G02F 1/133514 (2013.01); G02F 1/13394 (2013.01); *G02F 2001/136222* (2013.01)

(58) Field of Classification Search
CPC .......... G01F 1/13394; G01F 1/133514; G01F 2001/13396; G01F 2001/13398; G01F 2201/52; G01F 2001/136222; G01F 1/134309; G01F 1/1337; G01F 1/1339; G01F 1/136209

USPC ......... 349/155, 156, 106, 109, 162, 123, 108; 430/7; 359/586
See application file for complete search history.

(56) References Cited

U.S. PATENT DOCUMENTS 5,757,451 A     5/1998  Miyazaki et al.
6,287,733 B1 *  9/2001  Miyazaki et al. ................. 430/7
(Continued)

FOREIGN PATENT DOCUMENTS

JP    61-110227 A    5/1986
JP    61-165916 A    7/1986
(Continued)

OTHER PUBLICATIONS

Official Communication issued in International Patent Application No. PCT/JP2010/071278, mailed on Feb. 8, 2011, pp. 1-2 only.

*Primary Examiner* — Bumsuk Won
*Assistant Examiner* — Angela Davison
(74) *Attorney, Agent, or Firm* — Keating & Bennett, LLP

(57) ABSTRACT

The present invention provides a liquid crystal display panel which can prevent an electric short circuit (leakage) between a pair of substrates with no additional production step in the case where a multilayer spacer is used. The present invention is a liquid crystal display panel comprising: a pair of substrates; and a liquid crystal layer between the substrates, wherein a first substrate of the substrates has a support substrate, a plurality of pixel electrodes, transparent colored layers of plural colors overlapping with the pixel electrodes, and a multilayer spacer formed of a stacked body of three or more resin layers including transparent colored layers of plural colors, and a second substrate of the substrates has a supporting substrate and a common electrode.

5 Claims, 12 Drawing Sheets

(56) References Cited

U.S. PATENT DOCUMENTS

| | | |
|---|---|---|
| 6,690,446 B1 | 2/2004 | Okamoto et al. |
| 2006/0017872 A1 | 1/2006 | Tokuda et al. |

FOREIGN PATENT DOCUMENTS

| | | |
|---|---|---|
| JP | 03-263014 A | 11/1991 |
| JP | 04-048518 U | 4/1992 |
| JP | 07-056177 A | 3/1995 |
| JP | 08-195138 A | 7/1996 |
| JP | 09-080447 A | 3/1997 |
| JP | 10-177109 A | 6/1998 |
| JP | 2001-117085 A | 4/2001 |
| JP | 2003-156751 A | 5/2003 |
| JP | 2004-302298 A | 10/2004 |
| JP | 2006-030907 A | 2/2006 |
| JP | 2006-267524 A | 10/2006 |
| JP | 2009-204839 A | 9/2009 |

* cited by examiner

LIQUID CRYSTAL DISPLAY PANEL

TECHNICAL FIELD

The present invention relates to a liquid crystal display panel. More specifically, the present invention relates to a liquid crystal display panel comprising a stacked body of color filters as a spacer.

BACKGROUND ART

A Liquid Crystal Display (LCD) device has a pair of substrates and a liquid crystal layer between the substrates. Voltages are applied to the liquid crystal layer via electrodes formed on the substrates to change the alignment of liquid crystal molecules, thereby changing the polarization of the light passing through the liquid crystal layer so that images are displayed.

The pair of substrates sandwiching the liquid crystal layer have a certain distance (cell gap) therebetween kept by a spacer and are attached to each other by a sealing material. Examples of the spacer include a transparent bead-shaped spacer. Since the contrast may be lowered if the spacer is ununiformly dispersed, a pillar-shaped spacer may also be used (see Patent Literatures 1 to 6, for example).

For simplification of the production process, the pillar-shaped spacer may be produced by the following process. Upon formation of color filters of plural colors such as red, green, and blue in a pixel aperture region, color filters of the same colors are formed at a predetermined plural sites on a black matrix. In this manner, protruded portions formed of stacked color filters of three colors including red, green, and blue are formed, and these protruded portions are used as pillar-shaped spacers (see Patent Literatures 7 to 9, for example).

Commonly, the pair of substrates sandwiching the liquid crystal layer includes an array substrate having an electrode for application of the voltage to the liquid crystal layer, wirings, and a switching element such as a TFT (Thin Film Transistor), and a color filter substrate having a color filter for color display, and a black matrix, as two individual substrates.

Recently, a so-called color filter (CF) on array system is studied in which members such as a color filter and a black matrix are formed on an array substrate. In the CF on array system, margins for position adjustment of the members formed on each of the pair of substrates are not needed, so that the production process can be simplified and the pixel aperture ratio can be increased (see Patent Literature 10, for example).

CITATION LIST

[Patent Literature 1] JP-A 8-195138
[Patent Literature 2] JP-A 61-110227
[Patent Literature 3] JP-U 4-48518
[Patent Literature 4] JP-A 61-165916
[Patent Literature 5] JP-A 7-56177
[Patent Literature 6] JP-A 3-263014
[Patent Literature 7] JP-A 10-177109
[Patent Literature 8] JP-A 2003-156751
[Patent Literature 9] JP-A 2006-30907
[Patent Literature 10] JP-A 2001-117085

SUMMARY OF INVENTION

Technical Problems

FIG. 25 is a schematic view illustrating a cross section of a conventional liquid crystal display panel in which a pillar-shaped spacer (hereinafter, also referred to as multilayer spacer) formed of a stacked body of a color filter, a black matrix, and the like is used. The liquid crystal display panel illustrated in FIG. 25 has an array substrate 101, a color filter substrate 102, and a liquid crystal layer 103 between them.

In the array substrate 101, various wirings such as a gate wiring 121, a source wiring, and a drain wiring 122, and a TFT connected to these wirings are provided on a support substrate 111 made of glass or the like. These members are each isolated by an interlayer insulation layer 116. On the interlayer insulation layer 116, a plurality of pixel electrodes 113 are provided. The pixel electrodes 113 are each connected to the drain wiring 122 for supplying a predetermined signal, via contact holes 115 provided in the interlayer insulation layer 116. This allows individual charging of the pixel electrodes 113.

The color filter substrate 102 has color filters of the plural colors opposing to the pixel electrodes 113 across the liquid crystal layer 103. In each gap between the color filters, a black matrix (BM) is provided. A multilayer spacer 104 is provided on the support substrate 131 of the color filter substrate 102 and has a black matrix 112, a red (R) color filter 114R, a Green (G) color filter 114G, and a blue (B) color filter 114B stacked in this order from the support substrate 131 side. A common electrode 132 covers the entire surface of the multilayer spacer 104. On the common electrode 132, a cap insulation layer 117 is provided. Namely, the color filter substrate 102 has the support substrate 131, the multilayer spacer 104, the common electrode 132, and the cap insulation layer 117 stacked in this order towards the liquid crystal layer 103. The common electrode 132 covering the entire surface of the multilayer spacer 104 is formed concurrently with formation of a common electrode on a color filter in a pixel aperture region. The cap insulation layer 117 formed on the common electrode 132 is an insulation layer for preventing conduction between the common electrode 132 of the color filter substrate 102 and the pixel electrodes 113 of the array substrate 101. Even if a certain distance is provided between the electrodes provided on the pair of substrates, a short circuit (leakage) may be caused by attachment of the pair of substrates with deviation. Then, a pixel defect is caused, possibly resulting in defective display.

The present inventors have intensively studied about the case of using a multilayer spacer in which a color filter, a black matrix, and the like are stacked as a spacer for maintaining a distance between a pair of substrates sandwiching a liquid crystal layer. They noted that, though conduction can be prevented by a conventional multilayer spacer in which a cap insulation layer is formed on a common electrode, this method requires an additional production step for application and patterning of the cap insulation layer. Another possible method for preventing conduction is patterning in such a manner that a pixel electrode is partially removed in a region where the multilayer spacer is in contact with the array substrate. However, in this method, deviation caused in attachment of the pair of substrates should be considered. Moreover, the area of the removed part of the electrode needs to be larger than the contact area between the multilayer spacer and the array substrate. As a result, there may be a loss in the aperture area of the pixel aperture region.

The present invention has been devised in consideration of the state of the art. The present invention aims to provide a liquid crystal display panel which can prevent an electric short circuit (leakage) between a pair of substrates with no additional production step in the case where a multilayer spacer is used.

Solution to Problem

The present inventors noted that, since a multilayer spacer was conventionally provided on the color filter substrate, the entire multilayer spacer needed to be covered with a common electrode in the production process. They found out the following and solved the above problem. Namely, in the case where a multilayer spacer is provided in the array substrate, since pixel electrodes need to be patterned in the array substrate, the pixel electrodes can be formed without forming the pixel electrodes on the entire multilayer spacer even without an additional production steps. Moreover, a multilayer spacer provided in the array substrate can prevent a short circuit (leakage) between the electrodes respectively provided on a pair of substrates. Accordingly, the present invention was completed.

Namely, the present invention is a liquid crystal display panel comprising: a pair of substrates; and a liquid crystal layer between the substrates, wherein a first substrate of the substrates has a support substrate, a plurality of pixel electrodes, transparent colored layers of plural colors overlapping with the pixel electrodes, and a multilayer spacer formed of a stacked body of three or more resin layers including transparent colored layers of plural colors, and a second substrate of the substrates has a supporting substrate and a common electrode.

The liquid crystal display panel of the present invention is specifically described in the following.

The liquid crystal display panel of the present invention has a pair of substrates and a liquid crystal layer between the substrates. One or both of the substrates are provided with members such as electrodes, wirings, and switching elements so as to control the alignment of liquid crystal molecules in the liquid crystal layer. In this manner, the polarization of light passing through the liquid crystal layer is changed so that a desired image is displayed.

One of the substrates (hereinafter, also referred to as an array substrate) has a support substrate, a plurality of pixel electrodes, transparent colored layers of plural colors overlapping with the pixel electrodes, and a multilayer spacer formed of a stacked body of three or more resin layers including transparent colored layers of plural colors. The pixel electrodes positioned in correspondence with the transparent colored layers can control the alignment of liquid crystals in a unit of each transparent colored layer. Accordingly, the region where the pixel electrodes are arranged serves as a pixel aperture region. Adjustment of color balance of the transparent colored layers of plural colors enables display of various colors.

The liquid crystal display panel of the present invention is one embodiment of a so-called color filter on array system in which both transparent colored layers of plural colors and a plurality of pixel electrodes are provided in an array substrate. The color filter on array system allows larger margin for position adjustment, simplification of the production process, and increase in the pixel aperture ratio, compared to the case where transparent colored layers and the pixel electrodes are provided in different substrates.

In the liquid crystal display panel of the present invention, the multilayer spacer is provided in the same substrate where the transparent colored layer and the pixel electrode are formed. Each layer in the multilayer spacer may be formed of the same material as that used for the transparent colored layer formed in the pixel aperture region, and the layer may be integrated with the transparent colored layer in the pixel aperture region or separately provided. Moreover, the kind of the resin layers included in the multilayer spacer is not particularly limited. Other resin layers may be stacked if needed, in addition to the transparent colored layer in the pixel aperture region and a light shielding layer.

Since the pixel electrodes are individually arranged, patterning is needed in the production process. Accordingly, patterning excluding an area where the multilayer spacer is formed in the production process of the pixel electrode prevents formation of a conductive member on the surface of the multilayer spacer. Therefore, leakage between one substrate mentioned above and the other substrate can be avoided. Namely, it is preferable that the pixel electrodes do not cover the topmost, second-topmost, and third topmost resin layers of the resin layers included in the multilayer spacer.

The other substrate (hereinafter, also referred to as an opposed substrate) of the pair of substrates has a support substrate and a common electrode. Namely, the liquid crystal display panel of the present invention has a pair of electrodes sandwiching the liquid crystal layer. This configuration allows easy formation of an electric field in the liquid crystal layer, so that the alignment of liquid crystal molecules can be adjusted by the magnitude of the applied voltage.

The configuration of the liquid crystal display panel of the present invention is not especially limited as long as it essentially includes such components. The liquid crystal display panel may or may not include other components.

A preferable embodiment of the liquid crystal display panel of the present invention is specifically described in the following.

At least one of the transparent colored layers of plural colors overlapping with the pixel electrodes is preferably integrated with the transparent colored layer of the same color included in the multilayer spacer. Integration of one of the layers included in the multilayer spacer with the transparent colored layer in the pixel aperture region increases a margin for stacking.

The integrated transparent colored layer preferably has a smaller deformation rate than other resin layers included in the multilayer spacer do. The term "deformation rate" herein refers to a rate of the deformation of each resin layer relative to the deformation of the entire multilayer spacer. Among the transparent colored layers of plural colors included in the multilayer spacer, the layer integrated with the transparent colored layer in the pixel aperture region easily causes a crack in the pixel electrode because of the deformation when the stress is applied to the multilayer spacer. To solve this problem, among the transparent colored layers of plural colors included in the multilayer spacer, the transparent colored layer integrated with the transparent colored layer in the pixel aperture region is made to have a smallest deformation rate. In this manner, the possibility of disconnection of the pixel electrodes is reduced, so that generation of defective pixels is avoided.

An exemplary method of adjusting the deformation rate is adjustment of the hardness of each resin layer. The harder the resin layer is, the smaller the deformation becomes. The softer the resin layer is, the larger the deformation becomes. Accordingly, the integrated transparent colored layer is preferably harder than other resin layers included in the multilayer spacer. This configuration tends to concentrate deformation of the resin layers to the other resin layers when the stress is applied to the multilayer spacer.

The deformation rates of the other resin layers are preferably larger in an upper resin layer and smaller in a lower resin layer. Because of this, the pixel electrodes formed on a lower resin layer is less likely to be cracked. Similarly, the other resin layers are preferably less hard in an upper layer and harder in a lower resin layer. Arrangement of a harder resin layer as a lower layer of the multilayer spacer and a softer resin layer as an upper layer of the multilayer spacer tends to concentrate deformation of the resin layers to an upper layer when the stress is applied to the multilayer spacer.

A colorless layer is preferably positioned on a topmost transparent colored layer of the transparent colored layers of plural colors. In the liquid crystal display panel of a color filter on array system, a substrate opposing the substrate on which a color filter is arranged commonly has light-transmitting members such as a transparent substrate (glass substrate, plastic substrate), a transparent electrode, and an alignment film. In the substrate in which a color filter is arranged, if an alignment film formed in the pixel aperture region is also formed on the entire multilayer spacer, an additional patterning step is not needed. Accordingly, the layer on the transparent colored layers in the multilayer spacer is preferably such a colorless layer, from the standpoint of productivity.

A photorefractive index of the colorless layer and a photorefractive index of the topmost transparent colored layer preferably have a smaller difference than a photorefractive index of the colorless layer and a photorefractive index of a second-topmost transparent colored layer do at a wavelength of 550 nm. In the liquid crystal display panel of a color filter on array system, reflection on the top surface of the transparent colored layers included in the multilayer spacer may be a problem, which is different from a liquid crystal display panel in which an array substrate and a color filter substrate are two individual substrates. Therefore, to reduce the reflection on the refractive index interface, especially at a wavelength of 550 nm that is easily visually recognized by humans, positioned in an upper layer is a transparent colored layer having a lower luminous reflectance of light passing through the colorless layer to be positioned on the transparent colored layers. This configuration reduces the luminous intensity of the reflected light generated between the colorless layer positioned on the transparent colored layers and the transparent colored layers. As a result, the reflection based on the structure of the transparent colored layer included in the multilayer spacer can be effectively reduced.

A stacked body of the transparent colored layers of plural colors preferably has a smaller integrated value of luminous intensity of the reflected light in a visible wavelength range than any other stacked bodies including transparent colored layer of the same colors stacked in other possible orders do.

Humans visually sense reflected light based on the intensity of the reflected light in a visible light wavelength range (380 nm to 780 nm). The total luminous intensity of the reflected light visually sensed by humans is specifically calculated by the following method. Namely, the intensity of the reflected light of each wavelength component having wavelength dispersibility is multiplied by the spectral luminous efficiency defined by CIE (International Commission on Illumination). The resulting value is integrated in the visible light wavelength range. In this manner, the total luminous intensity of the reflected light is obtained. In the liquid crystal display panel of a color filter on array system, reflection based on the transparent colored layers included in the multilayer spacer may be a problem, which is different from a liquid crystal display panel in which an array substrate and a color filter substrate are individually used. The incident light on the transparent colored layers included in the multilayer spacer is attenuated upon passing through the transparent colored layers. Therefore, reflection of light based on the structure of the multilayer spacer has a biggest influence if generated on the interface between the topmost transparent colored layer and the layer thereon. On the other hand, the multilayer spacer formed of a stacked body of a plurality of transparent resin layers is also influenced by the reflection between the topmost transparent colored layer and the second-topmost transparent colored layer. This influence is great if the topmost transparent colored layer is formed thin, because the light incident on the transparent colored layers included in the multilayer spacer is not sufficiently attenuated upon passing through the transparent colored layers. Accordingly, on determination of the stacking order of the transparent colored layers included in the multilayer spacer, it is preferable to select a stacking order that results in the lowest reflectance, among all the stacking orders of the plurality of transparent colored layers.

Advantageous Effects of Invention

According to the liquid crystal display panel of the present invention, a short circuit between electrodes provided on a pair of substrates is avoided even if a multilayer spacer is used. Moreover, deviation generated in attachment of substrates is avoided, which is caused by use of two individual substrates as an array substrate and a color filter substrate.

DESCRIPTION OF EMBODIMENTS

Figure 1:
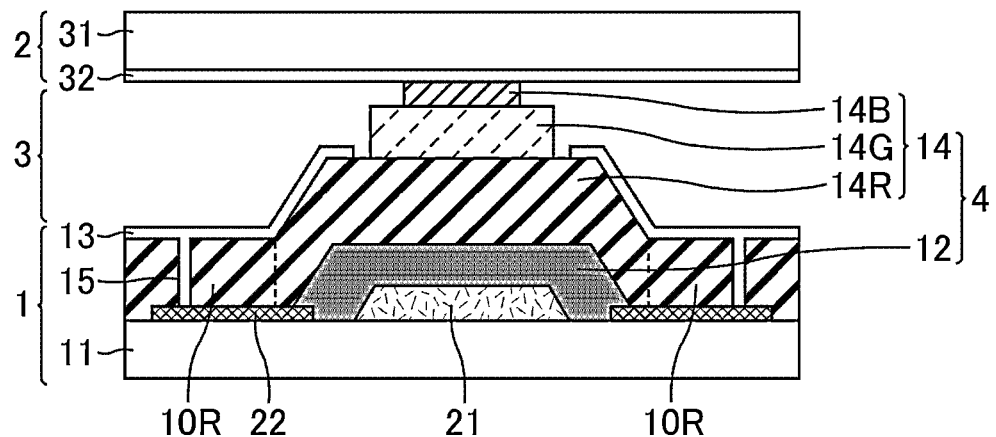
FIG. 1 is a schematic view illustrating a cross section of a liquid crystal display panel of Embodiment 1.

The present invention will be mentioned in more detail referring to the drawings in the following embodiments, but is not limited to these embodiments.

Embodiment 1

FIG. 1 is a schematic view illustrating a cross section of a liquid crystal display panel of Embodiment 1. As illustrated in FIG. 1, a liquid crystal display panel of Embodiment 1 has a pair of substrates 1 and 2 and a liquid crystal layer 3 between them, and also has a multilayer spacer 4 as a member controlling the distance between the substrates 1 and 2. The multilayer spacer 4 is formed in an array substrate 1.

The liquid crystal display panel of Embodiment 1 may be used in any modes such as VA mode and TN mode, as long as the substrates 1 and 2 respectively have electrodes.

As illustrated in FIG. 1, the array substrate 1 has a support substrate 11 made of glass and the like, various wirings such as a gate wiring 21, a source wiring, and a drain wiring 22, a TFT connected to these wirings, a plurality of pixel electrodes 13, transparent colored layers 10R (outer sides from the dotted lines drawn in the layer in FIG. 1) of plural colors in the pixel aperture region, and a multilayer spacer 4 in which a light shielding layer 12 and transparent colored layers 14 of plural colors are stacked. The electrodes and the wirings are each isolated by an interlayer insulation layer. The pixel electrodes 13 are each connected to the TFT via the drain wiring 22 and a contact hole 15, and are individually controlled. An opposed substrate 2 in Embodiment 1 has a support substrate 31 and a common electrode 32.

As illustrated in FIG. 1, the multilayer spacer 4 has the light shielding layer 12, a red transparent colored layer (spacer red layer) 14R, a green transparent colored layer (spacer green layer) 14G, and a blue transparent colored layer (spacer blue layer) 14B stacked in this order from the support substrate 11 side. As seen from the stacking order in FIG. 1, in Embodiment 1, layers are formed in the order of the light shielding layer 12, the red transparent colored layer 14R, the green transparent colored layer 14G, and the blue transparent colored layer 14B.

Figure 2:
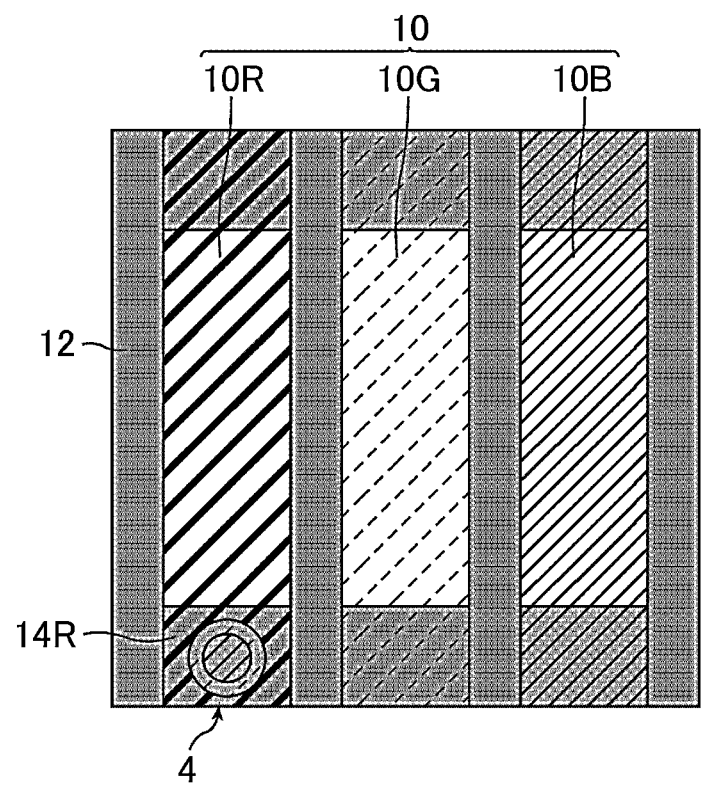
FIG. 2 is a schematic view illustrating a display face of the liquid crystal display panel of Embodiment 1.

FIG. 2 is a schematic view illustrating a display face of the liquid crystal display panel of Embodiment 1. As illustrated in FIG. 2, transparent colored layers 10R, 10G, and 10B of three colors including red, green, and blue are provided in Embodiment 1. The stacking order thereof is not particularly limited. The multilayer spacer 4 is provided in a red stripe region. Commonly, the transparent colored layer is also referred to as a color filter, and colors the display light by transmitting only visible light in a specific wavelength range. Arrangement of transparent colored layers of plural colors in combination enables color display. Regions where the transparent colored layers 10R, 10G, and 10B are arranged serve mainly as pixel aperture regions.

Commonly, the light shielding layer 12 is also referred to as a black matrix, and is positioned in a region in which light should be shielded such as a region between transparent colored layers of different colors and regions where wirings and a TFT are arranged. This region can be formed also by superposing transparent colored layers of plural colors, not by providing the light shielding layer 12.

As illustrated in FIG. 2, each of the spacer red layer 14R, the spacer green layer 14G, and the spacer blue layer 14B in the multilayer spacer has a circular shape when the multilayer spacer 4 is seen from the normal direction. Each layer has a round pillar shape. Moreover, a resin layer positioned in a lower layer is formed larger than a resin layer positioned in an upper layer. This configuration secures more margins for deviation of layers in the staking step.

The pixel electrodes 13 are positioned at regular intervals in the pixel aperture region. The red transparent colored layer 10R overlapping with a flat part of the pixel electrode 13 is the red transparent colored layer (red display portion) 10R serving as a pixel aperture region. The red transparent colored layer 14R overlapping with a resin layer such as the light shielding layer 12 is the red transparent colored layer (spacer red layer) 14R serving as the multilayer spacer 4.

The spacer red layer 14R is integrally formed with the red transparent colored layer (red display portion) 10R in the pixel aperture region around the multilayer spacer 4. The spacer green layer 14G and the spacer blue layer 14B are respectively isolated from the green transparent colored layer (green display portion) 10G and the blue transparent colored layer (blue display portion) 10B in the pixel aperture region.

In the case that the height of the spacer is insufficient, other resin layers may be included in the multilayer spacer 4. Moreover, an alignment film may be formed to cover the entire multilayer spacer 4. The alignment film can direct the adjacent liquid crystal molecules to a desired direction by an alignment treatment according to need. The alignment treatment is mainly conducted to the pixel aperture region.

The area adjacent to the multilayer spacer 4 in the liquid crystal layer 3 is preferably not used as the pixel aperture region because the alignment of liquid crystals in that area is affected by the multilayer spacer 4. That area can be eliminated from the pixel aperture region by the light shielding layer 12.

For the purpose of preventing a short circuit caused by a contact between the pixel electrode 13 of the array substrate 1 and the common electrode 32 of the opposed substrate 2, the pixel electrodes 13 are not formed on the top face and side faces of the topmost layer (spacer blue layer 14B) and a second-topmost layer (spacer green layer 14G) among the transparent colored layers 14R, 14G, and 14B included in the multilayer spacer 4. On the other hand, the pixel electrodes 13 are arranged on a part of the top face and the side faces of the third layer (spacer red layer 14R) from the top. With regard to any of the transparent colored layers 14R, 14G, and 14B included in the multilayer spacer 4, a lower layer is formed wider than an upper layer.

A method for forming the red transparent colored layers 14R and 10R, the green transparent colored layers 14G and 10G, and the blue transparent colored layers 14B and 10B is not particularly limited. An exemplary method includes the steps of applying a liquid photosensitive resin (resist) material to the support substrate 11 with a coater to form a photosensitive resin (resist) film, and patterning the photosensitive resin (resist) film by photolithography. Another exemplary method includes the steps of transferring a photosensitive resin film on the support substrate 11 using a dry film with a photosensitive resin film, and patterning the photosensitive resin film by photolithography.

Examples of the materials of the transparent colored layers 14R, 14G, 14B, 10R, 10G, 10B, and the black matrix 12 include resin materials such as photosensitive resins (resist). Examples of the materials of the pixel electrodes and the common electrode 13 include transparent metal oxides such as indium tin oxide (ITO) and indium zinc oxide (IZO). The material of the black matrix may be a metal such as chromium, instead of resin materials. However, in such a case, being not a resin layer, the black matrix is not considered to be a part of the multilayer spacer of the present invention.

Here, a description is given on a problem arising when the pressure is applied to a pair of substrates included in a liquid crystal display panel.

Figure 3:
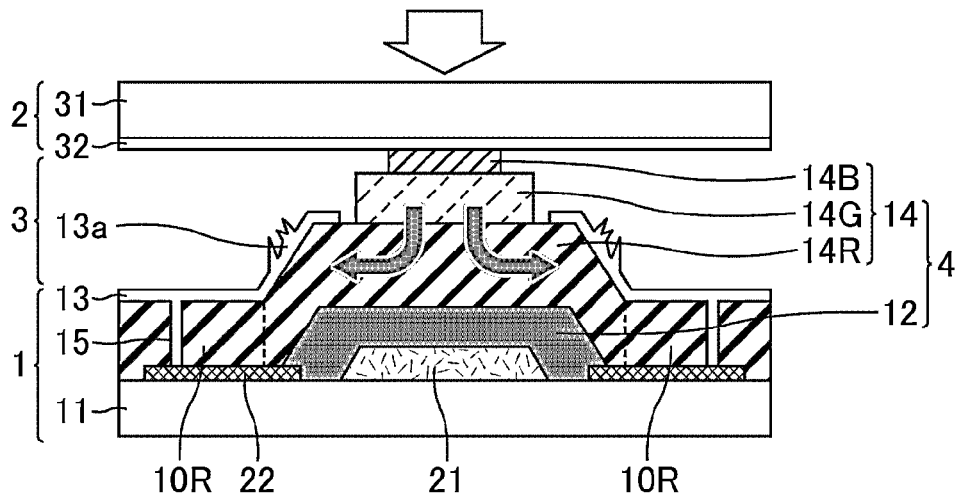
FIG. 3 is a schematic cross-sectional view illustrating a state where a pixel electrode is cracked by a certain pressure applied to a multilayer spacer in the liquid crystal display panel of a color filter on array system.

FIG. 3 is a schematic cross-sectional view illustrating a state where a pixel electrode is cracked by a certain pressure applied to a multilayer spacer in the liquid crystal display panel of a color filter on array system. Especially in a display device of mobile equipment and a display device having a touch panel, the display face of the liquid crystal display panel is likely to be strongly pushed by viewer's fingers or the like. In such a case, the stress is applied to the top of the multilayer spacer 4 in a direction indicated by arrows in FIG. 3 (from the outside).

If a predetermined or more of pressure is applied to the support substrate 31 of the opposed substrate 2, the stress is applied to the top of the multilayer spacer. The stress is transmitted to each resin layer included in the multilayer spacer so that the resin layer is deformed. Commonly, a spacer maintaining the distance between substrates in the liquid crystal display panel in which a pair of substrates are attached to each other is required to be flexible so as to follow the volume variation of the liquid crystal layer. A too-hard spacer is likely to cause bubbles due to a volume reduction of the liquid crystal layer, local unevenness due to detachment of the spacer from the opposed substrate because of a volume increase of the liquid crystal layer. Accordingly, the spacer is preferably deformable in accordance with the stress from the outside.

Use of a soft resin material for the spacer, instead of a hard glass or metal material, allows production of a spacer that is deformable in accordance with the stress from the outside. Here, the hardness of color materials used for the transparent colored layers in the multilayer spacer varies in accordance with the kind, concentration, size, and dispersion of pigments contained in a resin binder, and with the presence of a hardener for stabilizing the shape. In the case where the pigment concentration is high or a hardener is contained, the transparent colored layer is harder. When the stress is applied to the top of the multilayer spacer including a plurality of resin layers that are different in hardness, not all the layers are deformed in the same manner, but a softer layer is more likely to be deformed. Moreover, the volume corresponding to the thickness reduced by the stress applied in the direction of compression expands in an in-plane direction of the panel which is perpendicular to the direction of compression. As a result, the deformation is transmitted to the peripheral portion of the spacer.

Electrodes are formed on the resin layer included in the multilayer spacer 4. Since the electrodes cannot follow the deformation of resins, a part of the red transparent colored layer 14R that is greatly deformed under the pixel electrode 13 may rise so that the pixel electrode 13 may be cracked to have a crack portion 13a as illustrated in FIG. 3. Such a crack in the pixel electrode 13 is often formed in a substantially circular shape around the multilayer spacer. The range of the crack depends on the magnitude of the pressure from the outside. The crack in the pixel electrode 13 may cause defective display because an appropriate electric field cannot be formed to the liquid crystal layer 3 in the adjacent region. Especially, the pixel electrodes 13 in the array substrate may be patterned for determining the alignment direction on the occasion of the application of an electric field, different from the case of the common electrode 32 in the opposed substrate 2. In such a case, if the pixel electrodes 13 are damaged so much, the defective display area may be enlarged on the occasion of a disconnection in the pixel electrodes 13. This phenomenon is caused by deformation of an electrode on the red transparent colored layer 14R. Therefore, this problem cannot be solved by elimination of the red transparent colored layer 14R in the patterning step of the electrodes.

This problem is peculiar to the color filter on array system in which pixel electrodes and color filters are formed in the same substrate. Such a great influence is not found in the case of a common liquid crystal display panel in which a common electrode is formed on the entire color filter substrate regardless of the borders of pixels.

The liquid crystal display panel of Embodiment 1 has following configuration to solve such a problem.

In Embodiment 1, among the resin layers included in the multilayer spacer 4, the red transparent colored layer 14R integrated with the display portion is formed to have a smaller deformation rate than any other resin layers. Because of this, the pixel electrodes 13 are less likely to be cracked due to the deformation of the red transparent colored layer 14R, resulting in production of the liquid crystal display device offering the fine display quality without defective display.

With regard to the correlation of the deformation rates of other resin layers except for the red transparent colored layer 14R, the light shielding layer 12 in a lower layer is formed to have a deformation rate smaller than that of the green transparent colored layer 14G in an upper layer and that of the blue transparent colored layer 14B in an upper layer. The green transparent colored layer 14G in a lower layer is formed to have a deformation rate smaller than that of the blue transparent colored layer 14B in an upper layer. Such a relative evaluation can be verified with use of an ultrafine film hardness tester.

The red transparent colored layer 14R is formed to be harder than the light shielding layer 12, the green transparent colored layer 14G, and the blue transparent colored layer 14B. Because of this, the deformation rate when the stress is applied to the multilayer spacer is likely to be greater in the green transparent colored layer 14G or in the blue transparent colored layer 14B.

An exemplary method for adjusting the hardness of each layer included in the multilayer spacer 4 includes varying the rate of the pigment in the solid content concentration of the color material. Specifically, the higher the pigment concentration in the solid content is, the harder the layer becomes. Addition of a hardener into the solid content also adjusts the hardness of each layer. Moreover, the hardness of each layer can also be adjusted by firing conditions, exposure conditions and development conditions in formation of the transparent colored layer. Such a relative evaluation of the hardness can be verified by the following method. First, a plurality of samples are prepared which are different in the transparent colored layers to be integrated with the display portion. The samples were subjected to a test in which the same stress was applied to them. The degrees of cracks in the samples were compared.

In Embodiment 1, the hardness of each layer included in the multilayer spacer 4 is not determined by an absolute value, but a correlation between the layers. The reason for this is that, as mentioned above, which layer has a greater deformation rate in the entire deformation is important because the multilayer spacer 4 preferably has deformability to a certain degree in accordance with the stress. Accordingly, in Embodiment 1, the deformation rate is concentrated to the light shielding layer 12, the green transparent colored layer 14G, and the blue transparent colored layer 14B which are not integrated with the transparent colored layer in the display portion.

Figure 4:
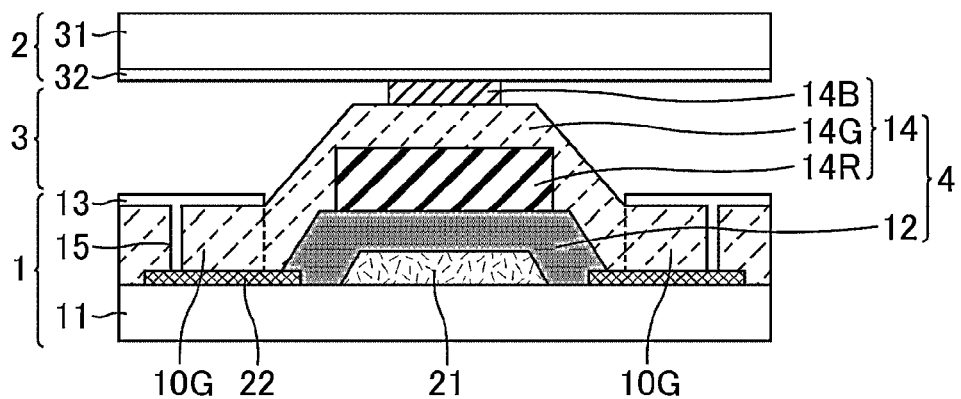
FIG. 4 is a schematic cross-sectional view illustrating Application Example 1 of Embodiment 1.
Figure 5:
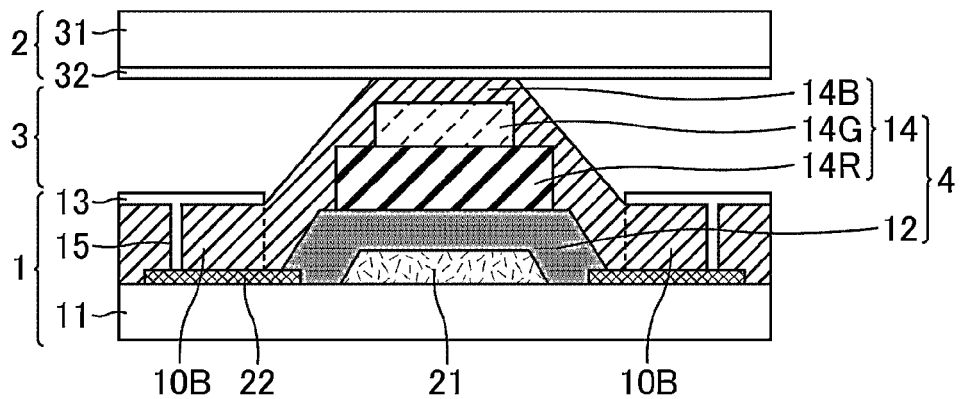
FIG. 5 is a schematic cross-sectional view illustrating Application Example 2 of Embodiment 1.

FIG. 1 illustrates a state where the red transparent colored layer 14R that is the lowest layer of the plurality of transparent colored layers is integrated with the transparent colored layer in the display portion. However, in Embodiment 1, the multilayer spacer 4 may be positioned in a green stripe region and the green transparent colored layer 14G that is a middle layer of the transparent colored layers of three colors including red, green, and blue, may be integrated with the display portion as illustrated in FIG. 4, for example. In this case, the green transparent colored layer 14G is formed to have a deformation rate smaller than that of the light shielding layer 12, that of red transparent colored layer 14R, and that of the blue transparent colored layer 14B (Application Example 1). Similarly, as illustrated in FIG. 5, the multilayer spacer 4 may be arranged in a blue stripe region, and the blue transparent colored layer 14B that is the topmost layer of the transparent colored layers of three colors including red, green, and blue may be integrated with the display portion. In this case, the blue transparent colored layer 14B is formed to have a deformation rate smaller than that of the light shielding layer 12, that of the red transparent colored layer 14R, and that of the green transparent colored layer 14G (Application Example 2). FIG. 4 is a schematic cross-sectional view illustrating Application Example 1 of Embodiment 1. FIG. 5 is a schematic cross-sectional view illustrating Application Example 2 of Embodiment 1.

Other embodiments of the present invention are specifically described in the following.

Embodiment 2

Figure 6:
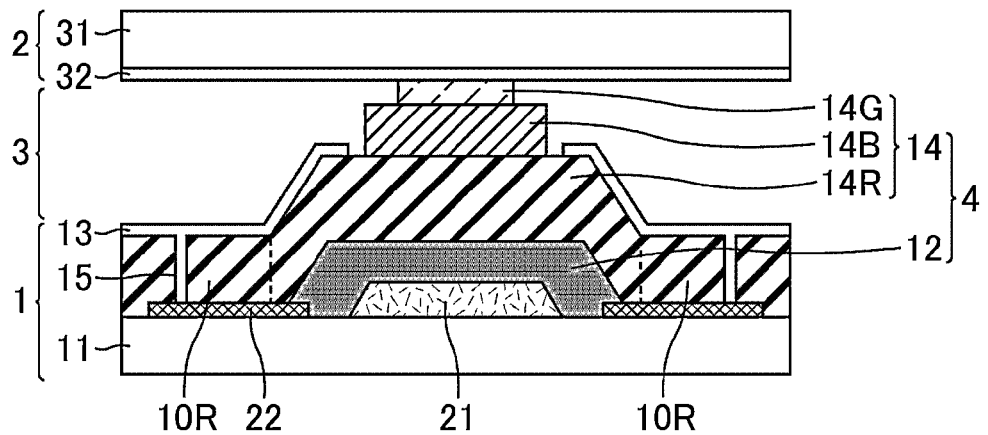
FIG. 6 is a schematic view illustrating a cross section of a liquid crystal display panel of Embodiment 2.

FIG. 6 is a schematic view illustrating a cross section of a liquid crystal display panel of Embodiment 2. The multilayer spacer 4 in Embodiment 2 is the same as that in Embodiment 1 except that the black matrix 12, the spacer red layer 14R, the spacer blue layer 14B, and the spacer green layer 14G are stacked in this order from the support substrate 11 side. In Embodiment 2, the spacer red layer 14R included in the multilayer spacer 4 is integrally formed with the red transparent colored layer (red display portion) 10R. Accordingly, the spacer red layer 14R is formed to have a deformation rate smaller than those of any other resin layers included in the multilayer spacer 4.

Embodiment 3

Figure 7:
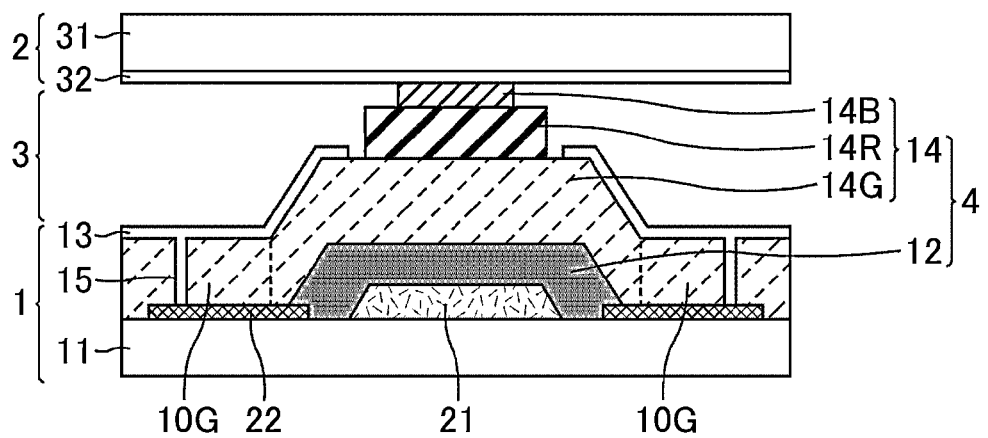
FIG. 7 is a schematic view illustrating a cross section of a liquid crystal display panel of Embodiment 3.

FIG. 7 is a schematic view illustrating a cross section of a liquid crystal display panel of Embodiment 3. In Embodiment 3, the multilayer spacer 4 is the same as that in Embodiment 1 except that the black matrix 12, the spacer green layer 14G, the spacer red layer 14R, and the spacer blue layer 143 are stacked in this order from the support substrate 11 side. In Embodiment 3, the spacer green layer 14G included in the multilayer spacer 4 is integrally formed with the green transparent colored layer (Green display portion) 10G. Accordingly, the spacer green layer 14G is formed to have a deformation rate smaller than those of any other resin layers included in the multilayer spacer 4.

Embodiment 4

Figure 8:
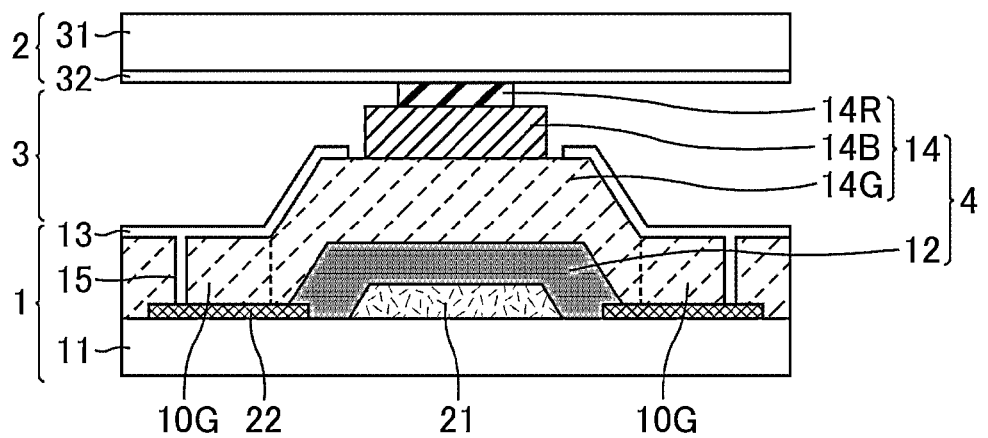
FIG. 8 is a schematic view illustrating a cross section of a liquid crystal display panel of Embodiment 4.

FIG. 8 is a schematic view illustrating a cross section of a liquid crystal display panel of Embodiment 4. In Embodiment 4, the multilayer spacer 4 is the same as that in Embodiment 1 except that the black matrix 12, the spacer green layer 14G, the spacer blue layer 14B, and the spacer red layer 14R are stacked in this order from the support substrate 11 side. In Embodiment 4, the spacer green layer 14G included in the multilayer spacer 4 is integrally formed with the green transparent colored layer (green display portion) 10G. Accordingly, the spacer green layer 14G is formed to have a deformation rate smaller than those of any other resin layers included in the multilayer spacer 4.

Embodiment 5

Figure 9:
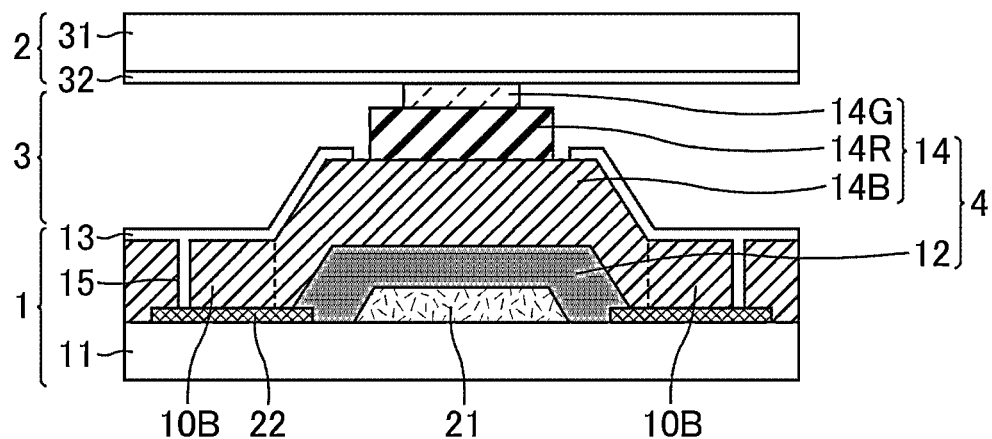
FIG. 9 is a schematic view illustrating a cross section of a liquid crystal display panel of Embodiment 5.

FIG. 9 is a schematic view illustrating a cross section of a liquid crystal display panel of Embodiment 5. In Embodiment 5, the multilayer spacer 4 is the same as that in Embodiment 1 except that the black matrix 12, the spacer blue layer 14B, the spacer red layer 14R, and the spacer green layer 14G are stacked in this order from the support substrate 11 side. In Embodiment 5, the spacer blue layer 14B included in the multilayer spacer 4 is integrally formed with the blue transparent colored layer (blue display portion) 10B. Accordingly, the spacer blue layer 14B is formed to have a deformation rate smaller than those of any other resin layers included in the multilayer spacer.

Embodiment 6

Figure 10:
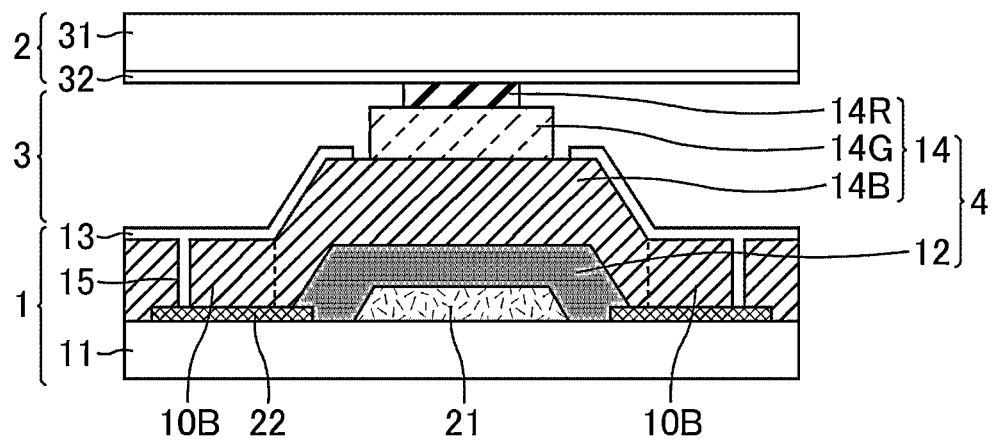
FIG. 10 is a schematic view illustrating a cross section of a liquid crystal display panel of Embodiment 6.

FIG. 10 is a schematic view illustrating a cross section of a liquid crystal display panel of Embodiment 6. In Embodiment 6, the multilayer spacer 4 is the same as that in Embodiment 1 except that the black matrix 12, the spacer blue layer 14B, the spacer green layer 14G, and the spacer red layer 14R stacked in this order from the support substrate 11 side. In Embodiment 6, the spacer blue layer 14B is formed integrally with the blue transparent colored layer (Blue display portion) 10B. Accordingly, the spacer blue layer 14B is formed to have a deformation rate smaller than those of any other resin layers included in the multilayer spacer 4.

Application Examples 1 and 2 of Embodiment 1 are applicable to any of Embodiments 2 to 6.

A description for each color material is given on an actual application of the liquid crystal display panels of Embodiments 1 to 6 to a display device.

Figure 11:
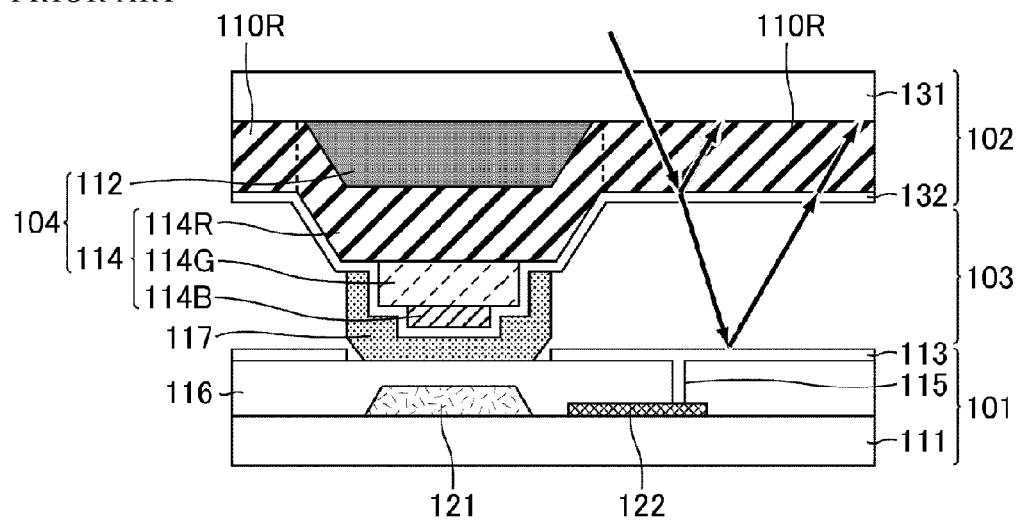
FIG. 11 is a schematic cross-sectional view illustrating a state where external light is reflected on a common liquid crystal display panel in which an array substrate and a color filter substrate are two individual substrates.

FIG. 11 is a schematic cross-sectional view illustrating a state where external light is reflected on a common liquid crystal display panel in which an array substrate and a color filter substrate are two individual substrates. As illustrated in FIG. 11, most of the external light reflected on a common liquid crystal display panel in which the array substrate 101 and the color filter substrate 102 are two individual substrates is reflected on the interface of the air and the support substrate 131 (glass). For example, the light reflected on the interface between the red transparent colored layer 110R and the common electrode 132 passes through the red transparent colored layer 110R twice, and therefore, most of the light is attenuated.

Figure 12:
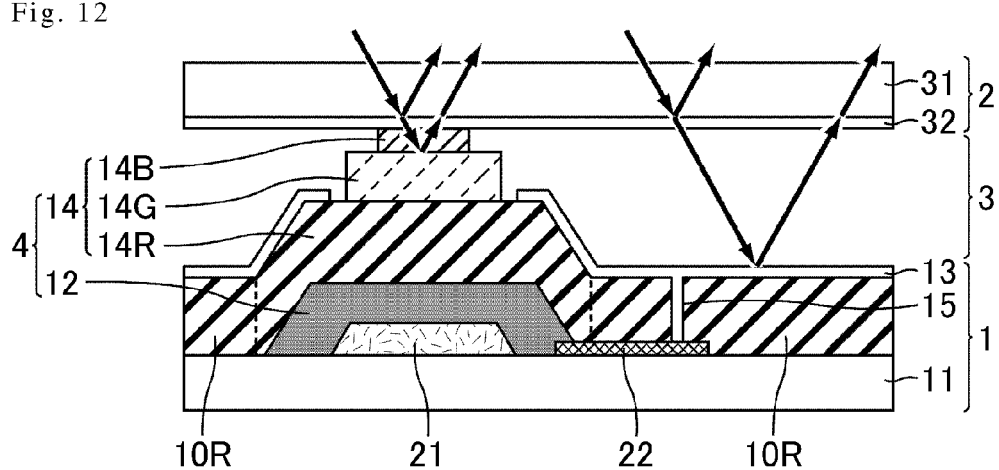
FIG. 12 is a schematic cross-sectional view illustrating a state where external light is reflected on the liquid crystal display panel of a color filter on array system.

FIG. 12 is a schematic cross-sectional view illustrating a state where external light is reflected on the liquid crystal display panel of a color filter on array system. As illustrated in FIG. 12, the external light reflected on the liquid crystal display panel of a color filter on array system is reflected on, in addition to the interface between the air and the support substrate 31 (glass), the interface between the color filter substrate 2 and the liquid crystal layer 3, and the interface between the liquid crystal layer 3 and the array substrate 1. The reason for this is that, since the light reflected on these interfaces does not pass through the color filter, the reflected light exits towards the outside without being attenuated. Such reflected light is recognized by the viewer and adversely affect the display. To solve such a problem, a countermeasure is needed such as a method for reducing the reflected light utilizing a cell gap and the refractive index anisotropy of the liquid crystal materials as disclosed in Patent Literature 4.

However, the problem cannot be solved by the above method with regard to the interface between the resin layer constituting the top of the multilayer spacer which is a top surface of the array substrate and the alignment film that is a top surface of the opposed substrate. Accordingly, the reflected light generated in this region exits towards the outside as it is. In addition, due to an arrangement of the same color materials of the multilayer spacer at regular cycles, the reflected light is enhanced by the interference to be more easily recognized. Since the spacer is positioned in a dark region such as a region on the wirings between the pixels and a region on the light shielding layer, the reflected light is preferably not generated. If the display of the liquid crystal display panel is in a light state, most of the light exiting from the liquid crystal display panel is in the pixel aperture region, and therefore the reflection elements of the external light is less recognized. However, if the display is in a dark state, the reflected light from the multilayer spacer is especially easily recognized.

Accordingly, in the case of employing the liquid crystal display panels of Embodiments 1 to 6, it is preferable to determine the appropriate embodiment to employ in consideration of the spectral luminous efficiency based on the refractive index wavelength dispersion of the color materials to be used.

The wavelength component having a reflectance that is easily visually recognized by humans, namely, the wavelength component having the highest luminous reflectance is 550 nm. If the materials greatly different in the refractive index at a wavelength of 550 nm are arranged, the reflected light on the interface thereof is enhanced. In such a case the reflected light is more easily visually recognized by humans compared to the case where materials having refractive indexes similar to each other are stacked. Accordingly, one exemplary method for reducing the reflectance based on the structure of the multilayer spacer is minimization of the change in the refractive index of the wavelength component at 550 nm.

Figure 13:
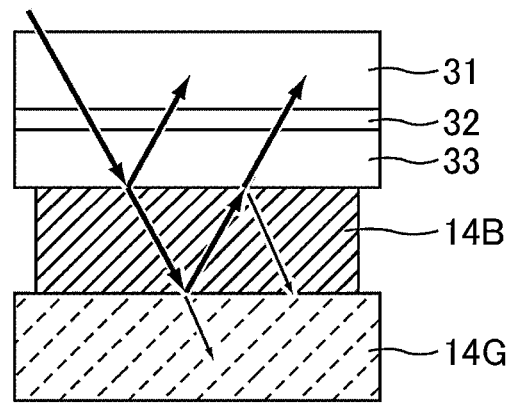
FIG. 13 is a schematic enlarged view illustrating a region where the top of a multilayer spacer in an array substrate and the surface of an opposed substrate are in contact with each other.

FIG. 13 is a schematic enlarged view illustrating a region where the top of a multilayer spacer in an array substrate and the surface of an opposed substrate are in contact with each other. As illustrated in FIG. 13, light entering from the outside passes through the support substrate (glass) 31, the common electrode 32, and an alignment film 33 in this order. The support substrate 31, the common electrode 32, and the alignment film 33 are all made of transparent materials. Exemplary materials of the alignment film 33 include polyimide and polyvinyl.

After passing through the support substrate 31, the common electrode 32, and the alignment film 33, the light reaching the interface between the alignment film 33 and the spacer blue layer 14B that is the topmost layer of the multilayer spacer 4 is separated to a component reflected on the interface between the alignment film 33 and the spacer blue layer 14B and a component passing through the spacer blue layer 14B.

The component reflected on the interface between the alignment film 33 and the spacer blue layer 14B again passes through the alignment film 33, the common electrode 32, and the support substrate 31 and exits towards the outside. On the other hand, the light having passed through the spacer blue layer 14B reaches the interface between the spacer blue layer 14B and the spacer green layer 14G, and is separated to a component reflected on the interface between the spacer blue layer 14B and the spacer green layer 14G and a component passing through the spacer green layer 14G.

In the case of forming a transparent colored layer by transferring a preliminary-filmed color material to the substrate, the transparent colored layers 14R, 14G, and 14B included in the multilayer spacer 4 each have the same thickness as the transparent colored layer in the pixel aperture region. In such a case, the thickness of the transparent colored layer positioned in the topmost layer is sufficiently secured, so that the intensity of the light passing through the topmost transparent colored layer is sufficiently attenuated. Accordingly, from the standpoint of reduction in the reflected light, the relation between the wavelength dispersibility of the refractive indexes of the colorless layer (the alignment film 33 in FIG. 13) and of the topmost transparent colored layer (the spacer blue layer 14B in FIG. 13) is most important. Namely, disorder of the wavelength dispersibility of the refractive index in a visible light wavelength range between the alignment film 33 and the spacer blue layer 14B is preferably smaller than that between the alignment film 33 and any of the other transparent colored layers (the spacer red layer 14R and the spacer green layer 14G) included in the multilayer spacer 4. This allows more reduction in the reflected light based on the structure of the multilayer spacer 4.

On the other hand, for example, in the case where transparent colored layers of plural colors included in the multilayer spacer is stacked by application of liquid color materials, the transparent colored layer in an upper layer may be thinner compared to the planar applied film. If the topmost transparent colored layer (the spacer blue layer 14B in FIG. 13) is formed thinner, the light passing through the spacer blue layer 14B reaches the interface with the second topmost transparent colored layer (the spacer green layer 14G in FIG. 13) before being attenuated sufficiently by the color material, so that the intensity of the reflected light is increased. In such a case, what is important is the relation between the wavelength dispersibility of the refractive index of the topmost transparent colored layer (the spacer blue layer 14B in FIG. 13) and that of the second-topmost transparent colored layer (the spacer green layer 14G in FIG. 13) among the transparent colored layers 14R, 14G, and 14B of plural colors included in the multilayer spacer. Namely, disorder of the wavelength dispersibility of the refractive index in a visible light wavelength range between the spacer blue layer 14B and the spacer green layer 14G is preferably smaller than that between the spacer blue layer 14B and the spacer red layer 14R. This allows more reduction in the reflected light based on the structure of the multilayer spacer 4.

Hereinafter, a plurality of examples (Examples 1 to 3) are described in which resin materials used for the multilayer spacers have different properties in the liquid crystal display panels of Embodiments 1 to 6. Here, the wavelength dispersibility of the refractive index in a visible light wavelength range of color materials can be measured by a refractive index measuring device such as an Abbe's refractive index meter and a spectral ellipsometer. Moreover, the integrated values of the luminous intensity of the reflected light can be obtained by using a spectral radiance meter.

Example 1

Figure 14:
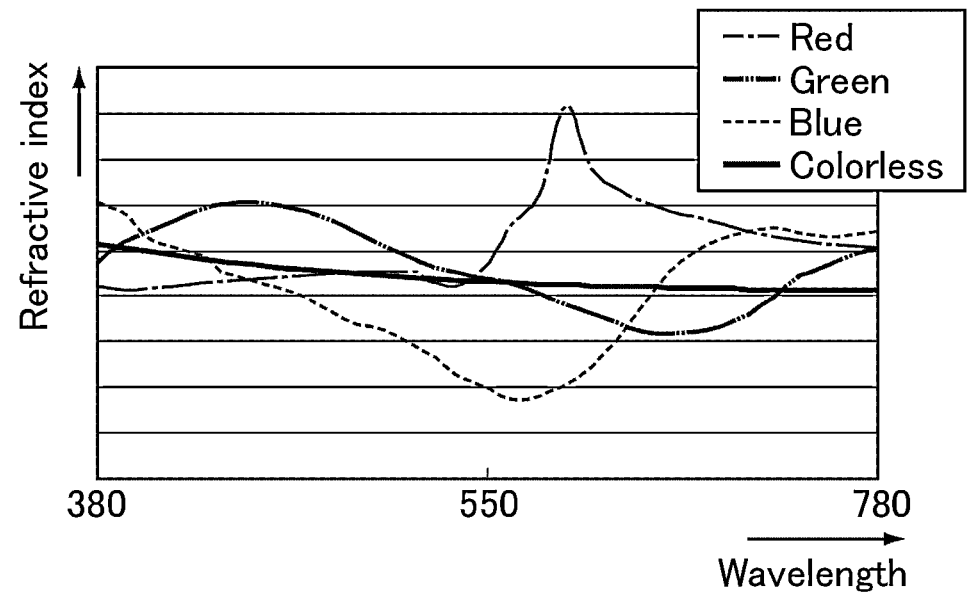
FIG. 14 is a graph showing one example (Example 1) of the wavelength dispersibility of the refractive index of respective color materials of transparent colored layers included in the multilayer spacer and of a material for a colorless layer (alignment film).

FIG. 14 is a graph showing one example (Example 1) of the wavelength dispersibility of the refractive index of respective color materials of transparent colored layers included in the multilayer spacer and of a material for a colorless layer (alignment film). As illustrated in FIG. 14, in Example 1, the refractive index of the alignment film material at a wavelength of 550 nm is almost the same as the refractive index of a green color material at a wavelength of 550 nm, and is different from the refractive indexes of the red and blue transparent colored layers. Difference in the refractive index is smaller between the color material of the red transparent colored layer and the alignment film material and larger between the color material of the blue transparent colored layer and the alignment film material.

As illustrated in FIG. 14, the refractive index of the color material of the green transparent colored layer at a wavelength of 550 nm is different from those of the red and blue transparent colored layers at a wavelength of 550 nm. The difference in the refractive index is smaller between the color material of the green transparent colored layer and of the red transparent colored layer, and is larger between the color materials of the green transparent colored layer and of the blue transparent colored layer is larger.

Figure 15:
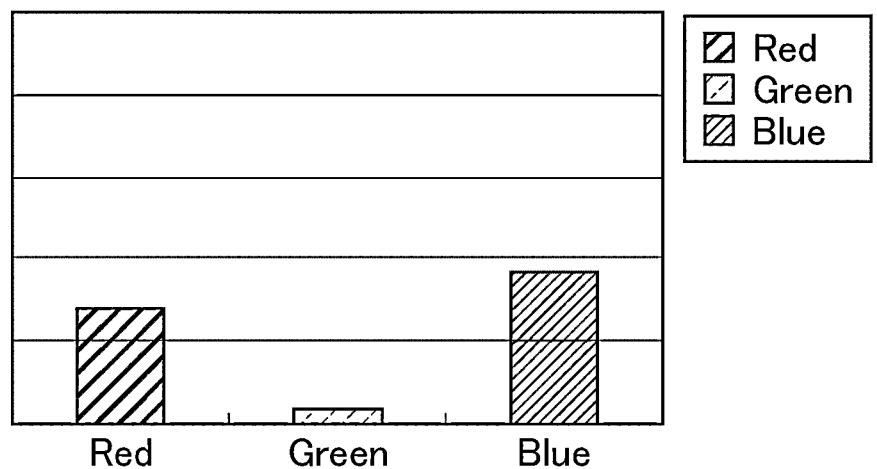
FIG. 15 is a graph showing integrated values of the luminous intensities of the reflected light of respective color materials of the transparent colored layers in Embodiment 1 stacked on the alignment film material in a visible light wavelength range.

FIG. 15 is a graph showing integrated values of the luminous intensities of the reflected light of respective color materials of the transparent colored layers in Embodiment 1 stacked on the alignment film material in a visible light wavelength range. As illustrated in FIG. 15, with regard to the luminous intensity of the reflected light in a visible light wavelength of the color materials on the alignment film interface, the green is the smallest, the red is considerably bigger than the green, and the blue is the biggest. Accordingly, in Example 1, the topmost transparent colored layer among the transparent colored layers included in the multilayer spacer is preferably the green transparent colored layer.

Figure 16:
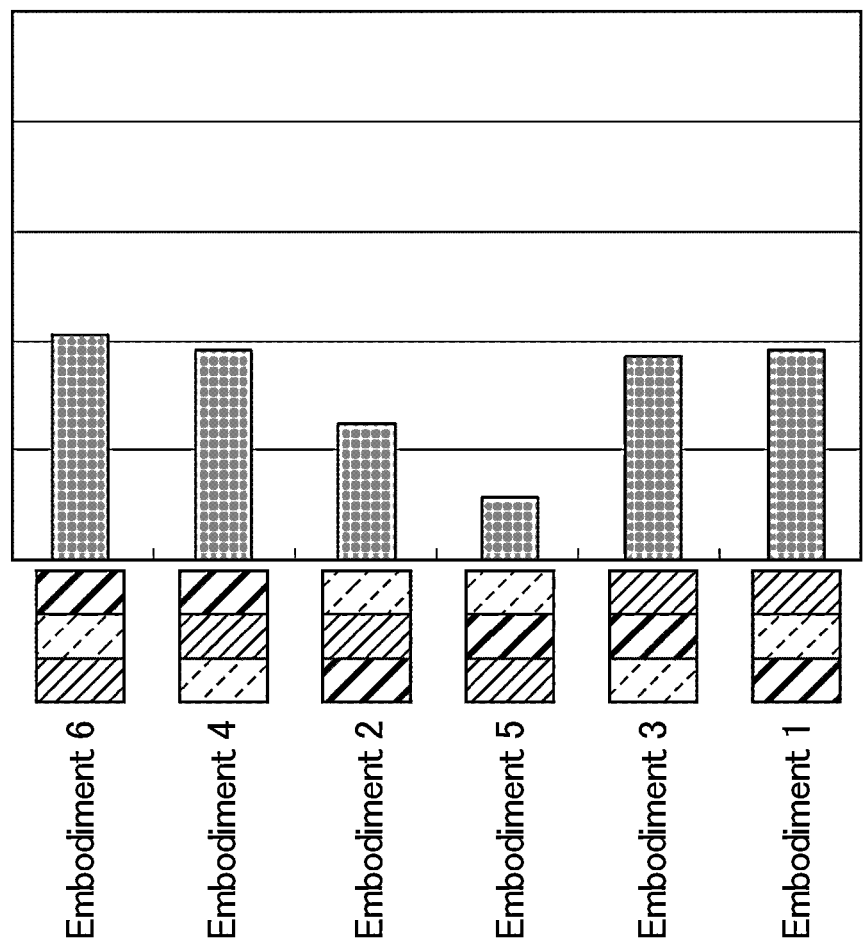
FIG. 16 is a graph showing integrated values of the luminous intensities of the reflected light in the liquid crystal display panels of Embodiments 1 to 6 in a visible light wavelength range, the integrated values varying due to a difference in the stacking order of the layers in stacked bodies including the color materials of the transparent colored layers of Example 1.

FIG. 16 is a graph showing integrated values of the luminous intensities of the reflected light in the liquid crystal display panels of Embodiments 1 to 6 in a visible light wavelength range, the integrated values varying due to a difference in the stacking order of the layers in stacked bodies including the color materials of the transparent colored layers of Example 1. As illustrated in FIG. 16, the integrated values of the luminous intensity of the reflected light in a visible light wavelength range of the stacked body is increased in the order of Embodiment 5, Embodiment 2, Embodiment 3, Embodiment 1, Embodiment 4, and Embodiment 6. Especially, the difference between Embodiment 5 and Embodiment 2 and the difference between Embodiment 2 and each of Embodiments 3, 1, 4, and 6 are great.

Accordingly, in the case of the combination of color materials in Example 1, from the standpoint of reduction in the reflected light, the transparent colored layers included in the multilayer spacer is most preferably stacked in the order of green, red, and blue from the top as in Embodiment 5, and second most preferably green, blue, and red from the top as in Embodiment 2.

Example 2

Figure 17:
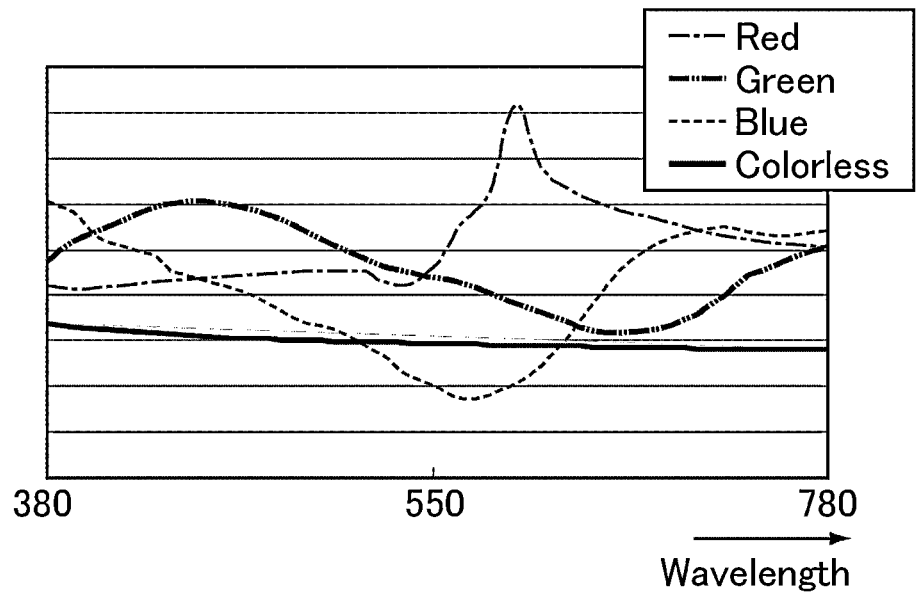
FIG. 17 is a graph showing another example (Example 2) of the wavelength dispersibility of the refractive index of respective color materials of the transparent colored layers included in the multilayer spacer and of a material for the colorless layer (alignment film).

FIG. 17 is a graph showing another example (Example 2) of the wavelength dispersibility of the refractive index of respective color materials of the transparent colored layers included in the multilayer spacer and of a material for the colorless layer (alignment film). As illustrated in FIG. 17, in Example 2, the refractive index of the alignment film material at a wavelength of 550 nm is different from the refractive indexes of any color materials of the red, green, and blue transparent colored layers at a wavelength of 550 nm. The difference in the refractive indexes is smallest between the alignment film material and the color material of the blue transparent colored layer, second smallest between the alignment film material and the color material of the green transparent colored layer, and largest between the alignment film material and the color material of the red transparent colored layer.

As illustrated in FIG. 17, the refractive index of the color material of the blue transparent colored layer at a wavelength of 550 nm is different from the refractive indexes of any color materials of the red and green transparent colored layers at a wavelength of 550 nm. The difference in the refractive index between the blue transparent colored layer and the red transparent colored layer is larger than that between the blue transparent colored layer and the green transparent colored layer.

Figure 18:
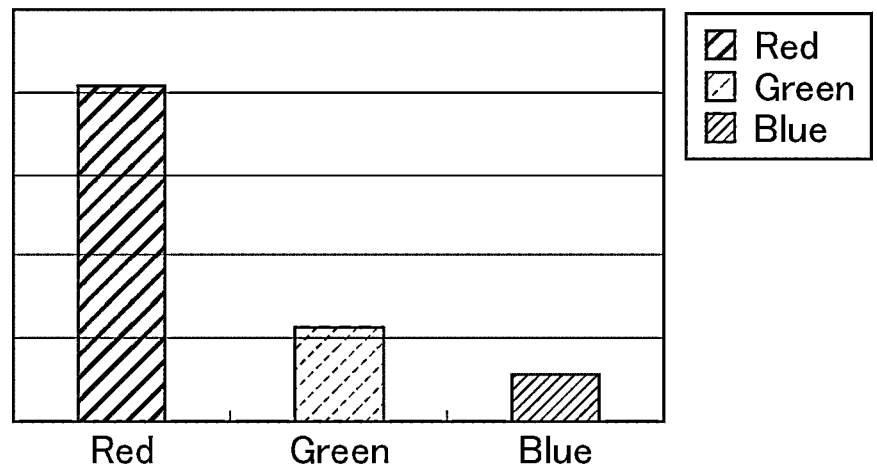
FIG. 18 is a graph showing integrated values of the luminous intensities of the reflected light of respective color materials of the transparent colored layers in Example 2 stacked on the alignment film material in a visible light wavelength range.

FIG. 18 is a graph showing integrated values of the luminous intensities of the reflected light of respective color materials of the transparent colored layers in Example 2 stacked on the alignment film material in a visible light wavelength range. As illustrated in FIG. 18, with regard to the integrated values of the luminous intensities of the reflected light of respective color materials on the alignment film interface in a visible light wavelength range, the blue is smallest, the green is second smallest, and the red is largest being greatly different from the blue and the green. Accordingly, in Example 2, the topmost transparent colored layer of the transparent colored layers included in the multilayer spacer is preferably the blue transparent colored layer.

Figure 19:
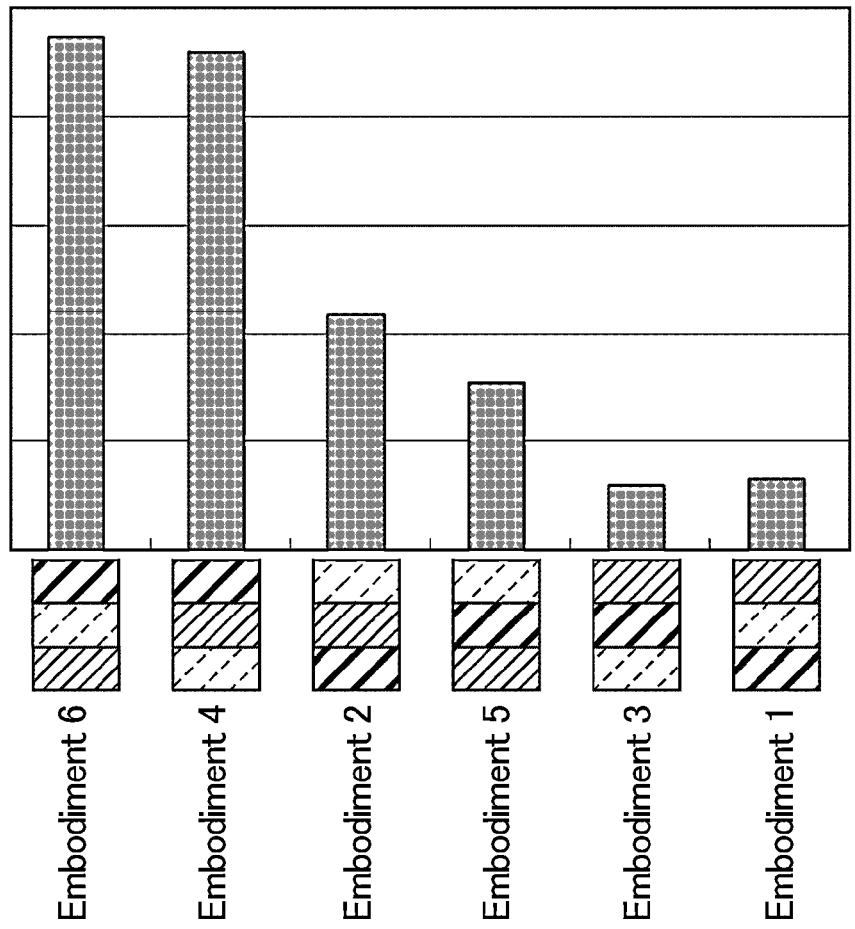
FIG. 19 is a graph showing integrated values of the luminous intensities of the reflected light in the liquid crystal display panels of Embodiments 1 to 6 in a visible light wavelength range, the integrated values varying due to a difference in the stacking order of the layers in stacked bodies of the color materials of the transparent colored layers of Example 2.

FIG. 19 is a graph showing integrated values of the luminous intensities of the reflected light in the liquid crystal display panels of Embodiments 1 to 6 in a visible light wavelength range, the integrated values varying due to a difference in the stacking order of the layers in stacked bodies of the color materials of the transparent colored layers of Example 2. As illustrated in FIG. 19, the integrated values of the luminous intensities of the reflected light of the stacked bodies in a visible light wavelength range are increased in the order of Embodiment 3, Embodiment 1, Embodiment 5, Embodiment 2, Embodiment 4, and Embodiment 6. Especially, the difference between Embodiment 1 and Embodiment 5 and the difference between Embodiment 2 and each of Embodiments 4 and 6 are great.

Accordingly, in the case of the combination of color materials in Example 2, from the standpoint of reduction in the reflected light, the transparent colored layers included in the multilayer spacer is most preferably stacked in the order of blue, red, and green from the top as in Embodiment 3, and second most preferably blue, green, and red from the top as in Embodiment 1.

Example 3

Figure 20:
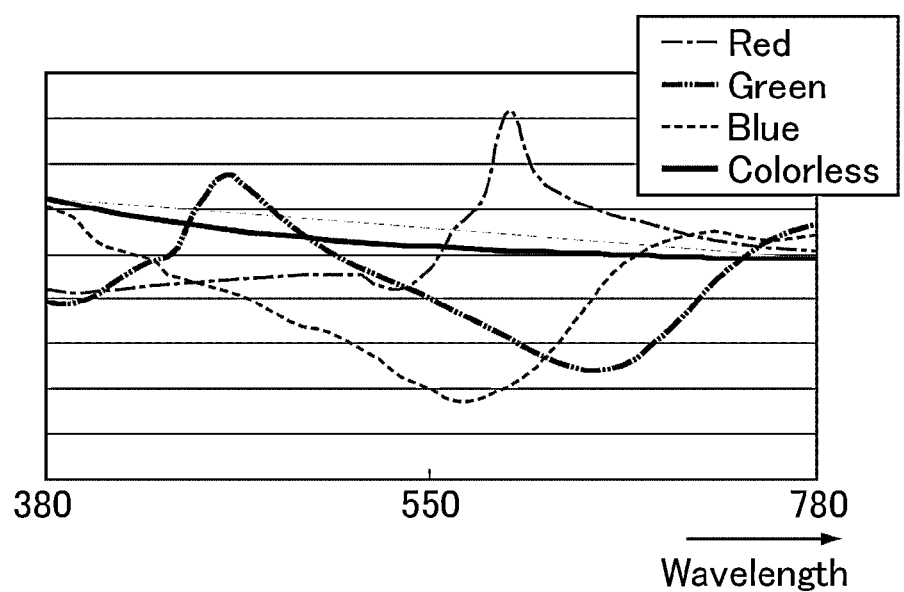
FIG. 20 is a graph showing another example (Example 3) of the wavelength dispersibility of the refractive index of respective color materials of the transparent colored layers included in the multilayer spacer and the wavelength dispersibility of the refractive index of a material for the colorless layer (alignment film).

FIG. 20 is a graph showing another example (Example 3) of the wavelength dispersibility of the refractive index of respective color materials of the transparent colored layers included in the multilayer spacer and the wavelength dispersibility of the refractive index of a material for the colorless layer (alignment film). As illustrated in FIG. 20, in Example 3, the refractive index of the alignment film material at a wavelength of 550 nm is different from the refractive indexes of any color materials of the red, green, and blue transparent colored layers at a wavelength of 550 nm. The difference in the refractive indexes is smallest between the alignment film material and the color material of the red transparent colored layer, second smallest between the alignment film material and the color material of the green transparent colored layer, and largest between the alignment film material and the color material of the blue transparent colored layer.

As illustrated in FIG. 20, the refractive index of the color material of the red transparent colored layer at a wavelength of 550 nm is different from the refractive indexes of any color materials of the green and blue transparent colored layers at a wavelength of 550 nm. The difference between the color materials of the red transparent colored layer and the blue transparent colored layer is larger than that between the color materials of the red transparent colored layer and the green transparent colored layer.

Figure 21:
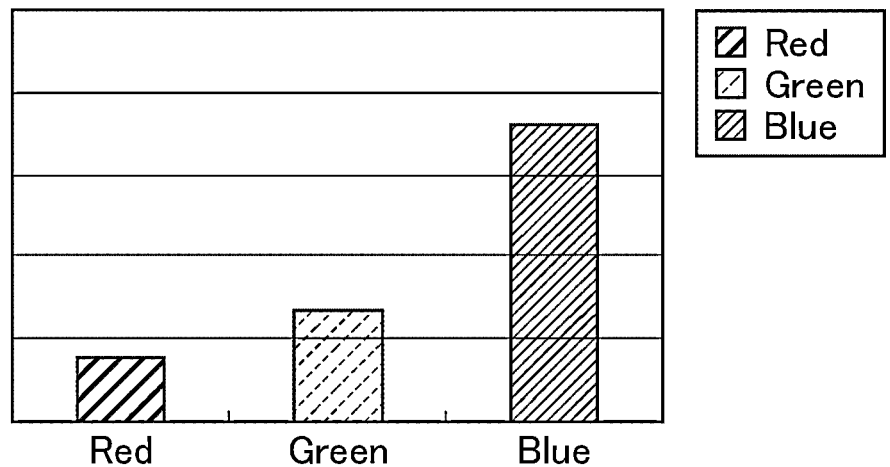
FIG. 21 is a graph showing integrated values of the luminous intensities of the reflected light of respective color materials of the transparent colored layers in Example 3 stacked on the alignment film material, in a visible light wavelength range.

FIG. 21 is a graph showing integrated values of the luminous intensities of the reflected light of respective color materials of the transparent colored layers in Example 3 stacked on the alignment film material in a visible light wavelength range. As illustrated in FIG. 21, with regard to the integrated values of the luminous intensities of the reflected light of respective color materials, the red is smallest, the green is second smallest, and the blue is largest being greatly different from the red and the green. Accordingly, in Example 3, the topmost transparent colored layer of the transparent colored layers included in the multilayer spacer is preferably the red transparent colored layer.

Figure 22:
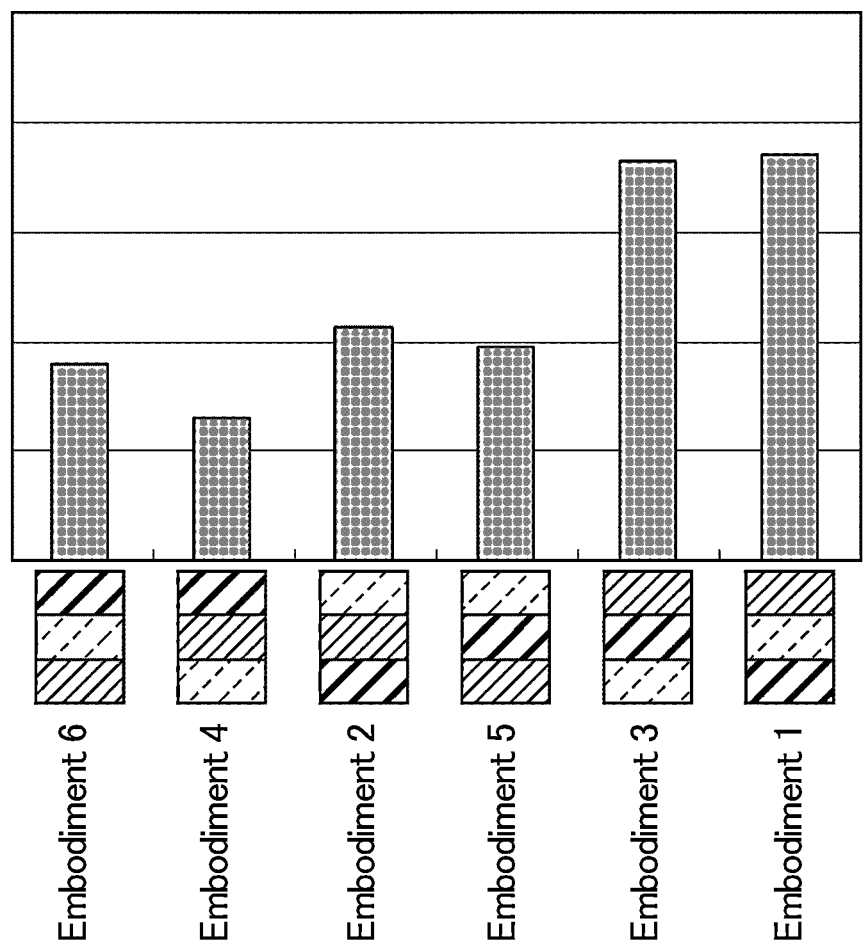
FIG. 22 is a graph showing integrated values of the luminous intensities of the reflected light in the liquid crystal display panels of Embodiments 1 to 6 in a visible light wavelength range, the integrated values varying due to a difference in the stacking order of the layers in stacked bodies of the color materials of the transparent colored layers of Example 3.

FIG. 22 is a graph showing integrated values of the luminous intensities of the reflected light in the liquid crystal display panels of Embodiments 1 to 6 in a visible light wavelength range, the integrated values varying due to a difference in the stacking order of the layers in stacked bodies of the color materials of the transparent colored layers of Example 3. As illustrated in FIG. 22, the integrated values of the luminous intensities of the reflected light of the stacked bodies in a visible light wavelength range are increased in the order of Embodiment 4, Embodiment 6, Embodiment 5, Embodiment 2, Embodiment 3, and Embodiment 1. Especially, the difference between Embodiment 2 and each of Embodiments 3 and 1 are great.

Accordingly, in the case of the combination of color materials in Example 3, from the standpoint of reduction in the reflected light, the transparent colored layers included in the multilayer spacer is most preferably stacked in the order of red, blue, and green from the top as in Embodiment 4, and second most preferably red, green, and blue from the top as in Embodiment 6.

As mentioned above, the stacking orders of the transparent colored layers included in the multilayer spacer of Embodiments 1 to 6 are preferably selected in such a manner that the luminous reflectance to human eyes is smaller, in consideration of the spectral luminous efficiency based on the wavelength dispersibility of the refractive index of the material to be used. Namely, the stacked body of the transparent colored layers of plural colors preferably has a smaller integrated value of the luminous intensity of the reflected light than any other stacked bodies including transparent colored layers of the same colors stacked in other possible orders do. This allows reduction in the reflected light based on the structure of the multilayer spacer.

In Embodiments 1 to 6, the description has been given on the case of layers of three colors including the red (R) transparent colored layer, the green (G) transparent colored layer, and the blue (B) transparent colored layer. Here, transparent colored layers of other colors may be appropriately used, such as a cyan (C) transparent colored layer, a magenta (M) transparent colored layer, and a yellow (Y) transparent colored layer. The stacking order is preferably determined by the same method mentioned above.

Embodiment 7

Figure 23:
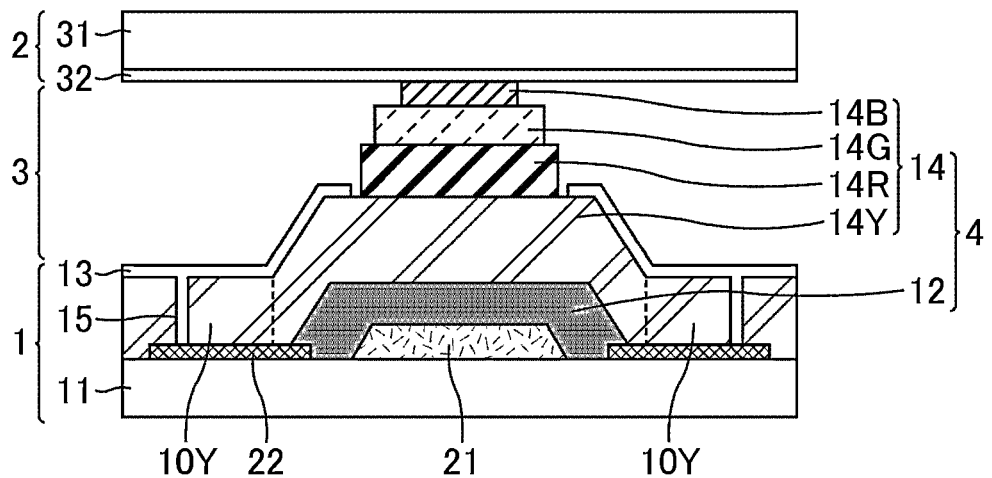
FIG. 23 is a schematic view illustrating a cross section of a liquid crystal display panel of Embodiment 7.

FIG. 23 is a schematic view illustrating a cross section of a liquid crystal display panel of Embodiment 7. In a liquid crystal display panel of Embodiment 7, four colors of layers are used including a yellow (Y) transparent colored layer in addition to the red (R) transparent colored layer, the green (G) transparent colored layer, and the blue (B) transparent colored layer. As illustrated in FIG. 23, in Embodiment 7, the multilayer spacer 4 is the same as that in Embodiment 1 except that the multilayer spacer 4 of Embodiment 7 has the light shielding layer 12, a spacer yellow layer 14Y, the spacer red layer 14R, the spacer green layer 14G, and the spacer blue layer 14B stacked in this order from a support substrate 11 side.

Figure 24:
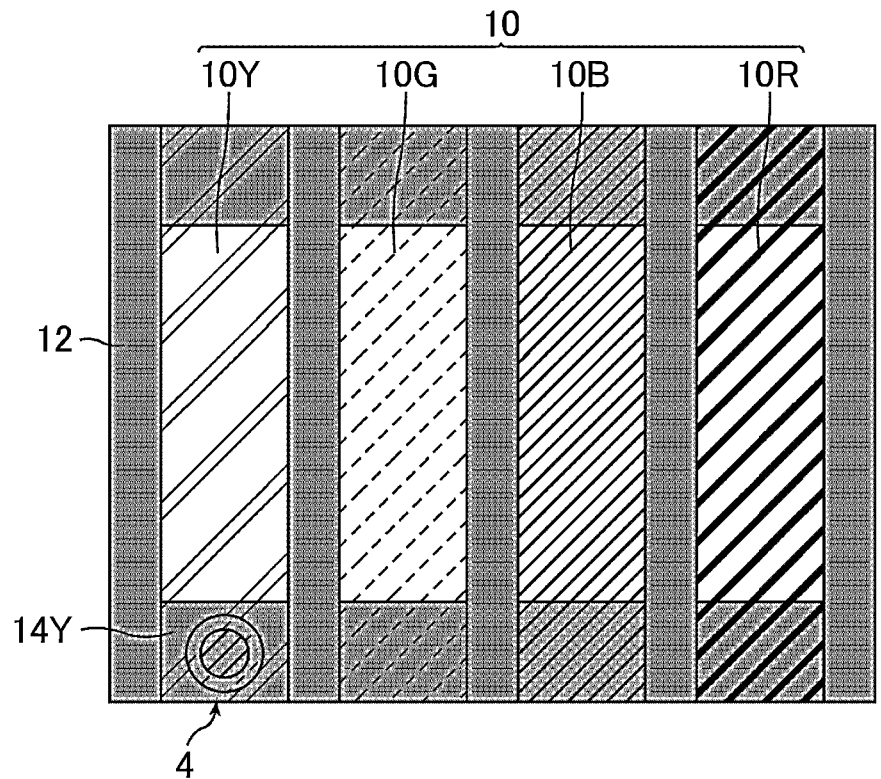
FIG. 24 is a schematic view illustrating a display face of the liquid crystal display panel of Embodiment 7.
Figure 25:
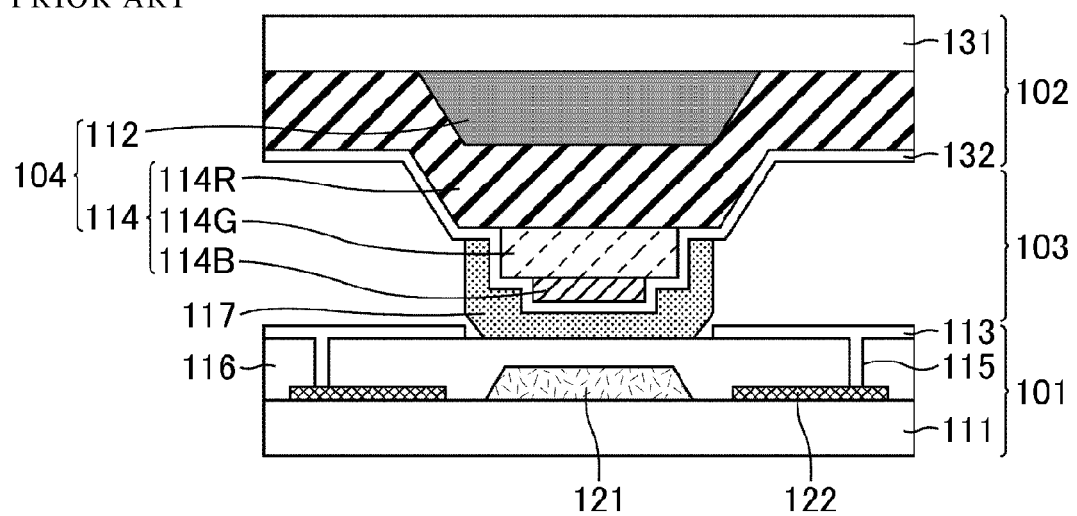
FIG. 25 is a schematic view illustrating a cross section of a conventional liquid crystal display panel having a multilayer spacer.

FIG. 24 is a schematic view illustrating a display face of the liquid crystal display panel of Embodiment 7. As illustrated in FIG. 24, in Embodiment 7, red, green, blue, and yellow transparent colored layers 10R, 10G, 10B, and 10Y are provided. The stacking order is not particularly limited. The multilayer spacer 4 is arranged in a yellow stripe region. Addition of yellow to red, green, and blue enhances color reproducibility.

In Embodiment 7, the spacer yellow layer 14Y is integrally formed with the yellow transparent colored layer (yellow display portion) 10Y in the pixel aperture region around the multilayer spacer 4. The spacer red layer 14R, the spacer green layer 14G, and the spacer blue layer 14B are respectively isolated from the red transparent colored layer (red display portion) 10R, the green transparent colored layer (green display portion) 10G, and the blue transparent colored layer (blue display portion) 10B in the pixel aperture regions.

In Embodiment 7, among the resin layers included in the multilayer spacer 4, the yellow transparent colored layer 14Y integrally formed with the display portion is formed to have a smaller deformation rate than other resin layers do. Moreover, the yellow transparent colored layer 14Y is formed to be harder than the light shielding layer 12, the red transparent colored layer 14R, the green transparent colored layer 14G, and the blue transparent colored layer 14B. This configuration allows the deformation rate when the stress is applied to the multilayer spacer to be larger in the light shielding layer 12, the red transparent colored layer 14R, the green transparent colored layer 14G, or the blue transparent colored layer 14B. Therefore, the yellow transparent colored layer 14Y is less likely to be deformed so that the pixel electrode is less likely to be cracked.

With regard to the correlation of the deformation rates of other resin layers except for the yellow transparent colored layer 14Y, the light shielding layer 12 is formed to have a smaller deformation rate than the red transparent colored layer 14R, the green transparent colored layer 14G, and the blue transparent colored layer 14B. The red transparent colored layer 14R is formed to have a smaller deformation rate than the green transparent colored layer 14G and the blue transparent colored layer 14B. The green transparent colored layer 14G is formed to have a smaller deformation rate than the blue transparent colored layer 14B.

Embodiments 8 to 30

In the liquid crystal display panels of Embodiments 8 to 30, layers of four colors are used including the yellow (Y) transparent colored layer in addition to the red (R) transparent colored layer, the green (G) transparent colored layer, and the blue (B) transparent colored layer. In the liquid crystal display panel of Embodiment 7, the layers are stacked in the order of yellow, red, green, and blue from the support substrate side. In Embodiments 8 to 30, stacking orders are different from this stacking order.

Specific stacking orders are described below.

Embodiment 8

The transparent colored layers are stacked in the order of yellow, red, blue, and green from the support substrate side.

Embodiment 9

The transparent colored layers are stacked in the order of yellow, green, red, and blue from the support substrate side.

Embodiment 10

The transparent colored layers are stacked in the order of yellow, green, blue, and red from the support substrate side.

Embodiment 11

The transparent colored layers are stacked in the order of yellow, blue, red, and green from the support substrate side.

Embodiment 12

The transparent colored layers are stacked in the order of yellow, blue, green, and red from the support substrate side.

Embodiment 13

The transparent colored layers are stacked in the order of red, yellow, green, and blue from the support substrate side.

Embodiment 14

The transparent colored layers are stacked in the order of red, yellow, blue, and green from the support substrate side.

Embodiment 15

The transparent colored layers are stacked in the order of green, yellow, red, and blue from the support substrate side.

Embodiment 16

The transparent colored layers are stacked in the order of green, yellow, blue, and red from the support substrate side.

Embodiment 17

The transparent colored layers are stacked in the order of blue, yellow, red, and green from the support substrate side.

Embodiment 18

The transparent colored layers are stacked in the order of blue, yellow, green, and red from the support substrate side.

Embodiment 19

The transparent colored layers are stacked in the order of red, green, yellow, and blue from the support substrate side.

Embodiment 20

The transparent colored layers are stacked in the order of red, blue, yellow, and green from the support substrate side.

Embodiment 21

The transparent colored layers are stacked in the order of green, red, yellow, and blue from the support substrate side.

Embodiment 22

The transparent colored layers are stacked in the order of green, blue, yellow, and red from the support substrate side.

Embodiment 23

The transparent colored layers are stacked in the order of blue, red, yellow, and green from the support substrate side.

Embodiment 24

The transparent colored layers are stacked in the order of blue, green, yellow, and red from the support substrate side.

Embodiment 25

The transparent colored layers are stacked in the order of red, green, blue, and yellow from the support substrate side.

Embodiment 26

The transparent colored layers are stacked in the order of red, blue, green, and yellow from the support substrate side.

Embodiment 27

The transparent colored layers are stacked in the order of green, red, blue, and yellow from the support substrate side.

Embodiment 28

The transparent colored layers are stacked in the order of green, blue, red, and yellow from the support substrate side.

Embodiment 29

The transparent colored layers are stacked in the order of blue, red, green, and yellow from the support substrate side.

Embodiment 30

The transparent colored layers are stacked in the order of blue, green, red, and yellow from the support substrate side. These stacking orders are each different from Embodiment 7. Except for this, Embodiments 8 to 30 are each the same as Embodiment 7. Namely, in any of Embodiments 8 to 30, among the resin layers included in the multilayer spacer 4, the resin layer integrally formed with the display portion is formed to have a smaller deformation rate than other resin layers do.

As described in Embodiment 1, the stacking orders of the transparent colored layers included in the multilayer spacer of Embodiments 7 to 30 are preferably selected in such a manner that the luminous reflectance to human eyes is smaller, in consideration of the spectral luminous efficiency based on the wavelength dispersibility of the refractive index of the material to be used. This allows reduction in the reflected light based on the structure of the multilayer spacer. Namely, the stacked body of the transparent colored layers of plural colors preferably has a smaller integrated value of the luminous intensity of the reflected light than any other stacked bodies including transparent colored layer of the same colors stacked in other possible orders do.

In Embodiments 7 to 30, the description has been given on the case of layers of four colors including the red (R) transparent colored layer, the green (G) transparent colored layer, the blue (B) transparent colored layer, and the yellow (Y) transparent colored layer. Here, in the same manner as in Embodiment 1 to 6, transparent colored layers of other colors may be used. Moreover, the number of colors is not limited to four, and five or more colors may be used.

The present application claims priority to Patent Application No. 2010-043160 filed in Japan on Feb. 26, 2010 under the Paris Convention and provisions of national law in a designated State, the entire contents of which are hereby incorporated by reference.

REFERENCE SIGNS LIST 1, 101: Array substrate
2: Opposed substrate
3, 103: Liquid crystal layer
4, 104: Multilayer spacer
10R: Red transparent colored layer (red display portion)
10G: Green transparent colored layer (green display portion)
10B: Blue transparent colored layer (blue display portion)
10Y: Yellow transparent colored layer (yellow display portion)
11, 31, 111, 131: Support substrate
12, 112: Light shielding layer (black matrix)
13, 113: Pixel electrode
13a: Cracked portion
14, 114: Transparent colored layer (color filter)
14R, 114R: Red transparent colored layer (spacer red layer)
14G, 114G: Green transparent colored layer (spacer green layer)
14B, 114B: Blue transparent colored layer (spacer blue layer)
14Y: Yellow transparent colored layer (spacer yellow layer)
15, 115: Contact hole
21, 121: Gate wiring
22, 122: Drain wiring
32, 132: Common electrode
33: Alignment film
102: Color filter substrate
116: Interlayer insulation layer
117: Cap insulation layer

The invention claimed is:

1. A liquid crystal display panel comprising:
   a pair of substrates; and
   a liquid crystal layer between the substrates, wherein
   a first substrate of the pair of substrates includes a support substrate, a light shielding layer, a plurality of pixel electrodes, transparent colored layers of plural colors overlapping with the pixel electrodes, and a multilayer spacer including a stacked body of three or more resin layers including a portion of the light shielding layer and transparent colored spacer layers of plural colors,
   a second substrate of the pair of substrates includes a supporting substrate and a common electrode,
   at least one of the transparent colored layers of plural colors overlapping with the pixel electrodes is integrated with one of the transparent colored spacer layers of a same color included in the multilayer spacer,
   the integrated transparent colored layer has a smaller deformation rate than other resin layers included in the multilayer spacer, and includes a projecting portion on the portion of the light shielding layer included in the multilayer spacer, and
   the plurality of pixel electrodes include a pixel electrode arranged on a portion of a top surface and a side surface of the protecting portion.

2. The liquid crystal display panel according to claim 1, wherein
   deformation rates of the other resin layers are larger in an upper resin layer and smaller in a lower resin layer.

3. The liquid crystal display panel according to claim 1, wherein
   a colorless layer is provided on a topmost transparent colored layer of the transparent colored layers of plural colors.

4. The liquid crystal display panel according to claim 3, wherein
   a photorefractive index of the colorless layer and a photorefractive index of the topmost transparent colored layer have a smaller difference than a photorefractive index of the colorless layer and a photorefractive index of a second-topmost transparent colored layer do at a wavelength of 550 nm.

5. The liquid crystal display panel according to claim 1, wherein
a stacked body of the transparent colored layers of plural colors has a smaller integrated value of a luminous reflection intensity in a visible wavelength range than any other stacked bodies including transparent colored layer of the same colors stacked in other possible orders do.

* * * * *